United States Patent [19]

Sadr

[11] Patent Number: 4,865,799

[45] Date of Patent: Sep. 12, 1989

[54] METHOD FOR ALIGNING EXTRUDED PARISON INTO SEPENTINE-SHAPED MOLD CAVITY

[75] Inventor: Changize Sadr, Weston, Canada

[73] Assignee: ABC Group, Rexdale, Canada

[21] Appl. No.: 207,235

[22] Filed: Jun. 16, 1988

[30] Foreign Application Priority Data

Jun. 18, 1987 [CA] Canada ................................ 540,088

[51] Int. Cl.⁴ ...................... B29C 49/04; B29C 49/58
[52] U.S. Cl. .................................. 264/526; 264/500;
264/523; 264/536; 264/540; 425/387.1;
425/525; 425/532
[58] Field of Search .............. 264/500, 526, 536, 540,
264/541, 523; 425/387.1, 532, 525

[56] References Cited

U.S. PATENT DOCUMENTS

| | | | |
|---|---|---|---|
| 3,380,121 | 4/1968 | Chittenden et al. | 264/526 |
| 3,408,692 | 11/1968 | Schaich | 264/540 |
| 3,479,420 | 11/1969 | Wilson et al. | 264/540 |
| 3,662,048 | 5/1972 | Turner | 264/520 |
| 3,789,093 | 1/1974 | Bose | 264/526 |
| 3,809,521 | 5/1974 | LaFosse | 264/540 |
| 4,026,983 | 5/1977 | Stockwell | 264/541 |
| 4,239,474 | 12/1980 | Nakagawa | 264/540 |
| 4,246,227 | 1/1981 | Crosby et al. | 264/541 |
| 4,738,612 | 4/1988 | Kikuchi et al. | 264/540 |
| 4,777,006 | 10/1988 | Wenger et al. | 264/526 |

*Primary Examiner*—Jan H. Silbaugh
*Assistant Examiner*—Neil M. McCarthy
*Attorney, Agent, or Firm*—George A. Seaby

[57] ABSTRACT

When blow molding elongated serpentine tubes or similar articles, loading of the mold cavity with the parison can present a problem. The parison can stick against the wall of the mold cavity. Moreover, a large diameter parison must be used, i.e. the parison must have a diameter equal to the total width dimension of the article, and consequently a large volume of flash is produced. The flash must be trimmed and recycled. In order to avoid these problems, inserts are placed in the mold to define portions of the mold cavity, particulary at corners. Air under pressure is fed into passages in the outer surfaces of the inserts and discharged through small orifices in such inserts against the parison to guide and drive the latter fully into the mold cavity. A vacuum can also be applied to the end of the cavity remote from the parison entry point for drawing the parison into the mold.

2 Claims, 2 Drawing Sheets

METHOD FOR ALIGNING EXTRUDED PARISON INTO SEPENTINE-SHAPED MOLD CAVITY

BACKGROUND OF THE INVENTION

1. Field of the Invention

This invention relates to the blow molding of a hollow plastic article, and in particular to a method and apparatus for the blow molding of elongated, serpentine, hollow articles.

2. Discussion of the Prior Art

In general, it is difficult to mold long, serpentine, hollow articles. The normal procedure is to use a large diameter parison, and the loading of such a parison into the mold presents problems since the parison can stick to the sides of the mold cavity. Moreover, a large diameter parison must be used, i.e. the parison must have a diameter equal to the total width dimension of the article, and consequently a large volume of flash is produced. The flash must be trimmed and recycled. U.S. Pat. No. 4,239,474, which issued to T. Nakagawa on Dec. 16, 1980 describes a method in which a mold is loaded by dispensing a parison from an extruder into the open, moving mold. Thereafter, the mold is closed around the parison, and air under pressure is applied to the interior of the parison to blow mold an elbow pipe. The apparatus involved is, of necessity somewhat complicated and cumbersome.

The object of the present invention is to offer a solution to the above identified problems by providing a relatively simple apparatus, which can be used to blow mold hollow articles having complicated, i.e. other than straight shapes.

GENERAL DESCRIPTION OF THE INVENTION

Accordingly, the invention relates to a method of blow molding a hollow plastic article comprising the steps of:

(a) closing a mold to define a mold cavity;

(b) introducing a parison which is smaller than the mold cavity into one end of the mold cavity;

(c) blowing air into the mold cavity to guide the parison during passage thereof into the mold cavity to ensure proper loading of the parison into the mold cavity;

(d) closing said one end of the mold cavity; and (e) applying air under pressure to the interior of the parison to blow mold the hollow article.

The invention also relates to an apparatus for blow molding a hollow plastic article comprising:

(a) mold portions for closing to define a mold cavity;

(b) nozzle means for introducing a parison into the mold cavity;

(c) insert means in said mold portions defining orifices for directing air under pressure against the parison to guide the latter into the mold cavity;

(d) cylinder means for closing the mold cavity; and (e) pin means for blowing air under pressure into the interior of the parison to blow mold the hollow article.

BRIEF DESCRIPTION OF DRAWINGS

The invention will be described in greater detail with reference to the accompanying drawings, which illustrate a preferred embodiment of the invention, and wherein.

DESCRIPTION OF PREFERRED EMBODIMENTS

Figure 1:
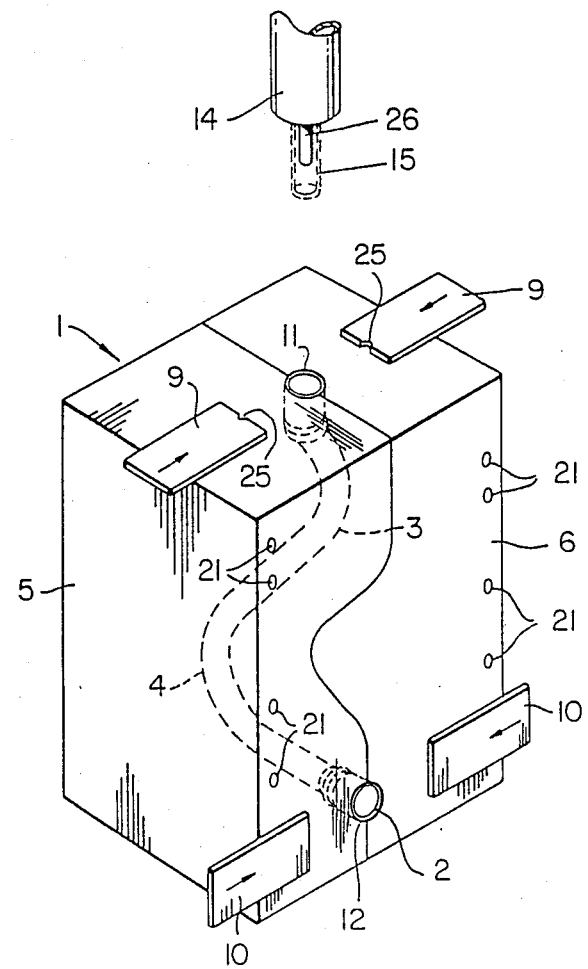
FIG. 1 is a schematic, perspective view of a mold for blow molding an elongated, serpentine tube.

Referring to the drawings, the apparatus of the present invention, which is generally indicated at 1, is designed to blow mold an elongated, serpentine, plastic tube 2. The tube 2 shown in phantom outline in FIG. 1 has two distinct bends or corners 3 and 4 which are in different planes.

Figure 3:
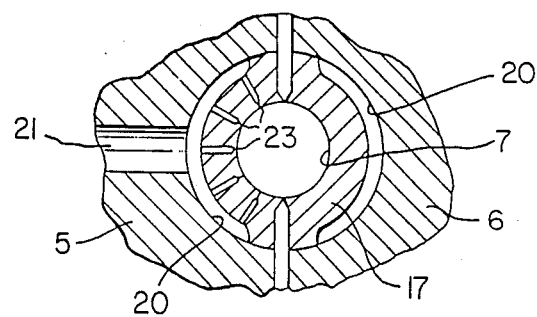
FIG. 3 is a cross section taken generally along line III—III of FIG. 2.
Figure 2:
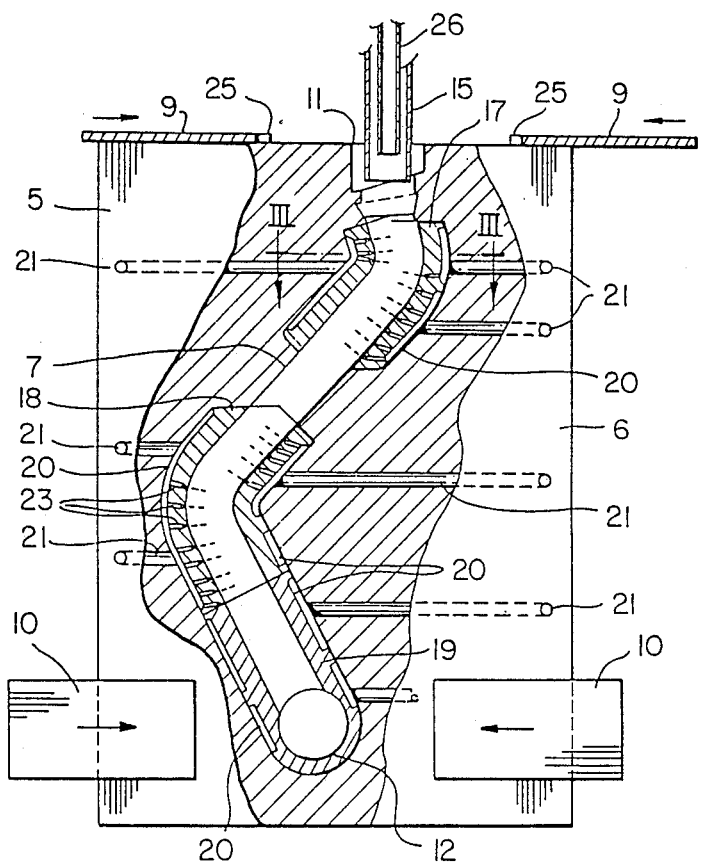
FIG. 2 is a partly sectioned, side view of the mold of FIG. 1.

The apparatus 1 is defined by a pair of mold halves 5 and 6, which are brought together to define a mold cavity 7 (FIGS. 2 and 3). Of course, the mold cavity 7 defines the external configuration of the tube 2. Upper and lower pinch-off gates 9 and 10, respectively are used to close the top and bottom ends 11 and 12, respectively of the mold cavity 7. A nozzle 14 is used to introduce a tubular parison 15 into the top end of the mold cavity 7.

As mentioned hereinbefore, loading of the parison 15 into the mold cavity 7 can be a serious problem. With a serpentine mold cavity 7, the possibility of sticking, i.e. intimate contact between the parison 15 and the sides of the cavity 7 is quite distinct. In order to solve this problem, the portions of the mold cavity 7 in the areas of the corners 3 and 4 are enlarged to receive inserts 17, 18 and 19. Grooves are provided in the outer surfaces of the inserts to define generally semi-cylindrical passages 20 for receiving air under pressure. The passages 20 receive air from inlet passages 21, which pass through the mold halves 5 and 6, and which are connected to a source of air (not shown) under pressure. It will be appreciated that the inner surfaces of the inserts 17, 18 and 19 define portions of the mold cavity 7. Air entering the passages 20 is discharged into the mold cavity 7 through orifices 23. The discharge ends of the orifices have a small diameter (0.015–0.020′).

In operation, the mold is closed by moving the halves 5 and 6 together to define the mold cavity 7, and the tubular parison 15 is introduced into the open top end 11 of the mold cavity 7. As the parison 15 moves towards the open bottom end 12 of the mold cavity 7, jets of air issuing from the orifices 23 maintain the parison 15 centered in the mold cavity and help drive the parison towards such bottom end 12. If desired, a vacuum can be applied to the bottom end 12 of the mold cavity 7 to facilitate loading of the parison 15 into the mold. The combination of pressure from the orifices 23 and a vacuum ensures proper mold loading. The nozzle 14 is withdrawn and the gates 9 and 10 are closed. Notches 25 in the top gates 9 define an opening for a blow pin 26 (FIGS. 1 and 2), which is used to introduce air under pressure into the parison 15 to effect blow molding.

The gates 9 and 10 are opened, the blow pin 26 is removed, and the mold halves 5 and 6 are moved apart to open the mold. The molded tube 2 is removed, and the mold 1 is ready for new loading and blow molding operations.

Thus, there has been described a relatively simple method and an apparatus for blow molding an elongated, serpentine article without the common problem of parison sticking.

It will be appreciated that the number, distribution and angle of the orifices with respect to the mold cavity can be varied depending upon the shape and thickness of the article being molded. Moreover, the air pressure on various sides of the mold cavity can differ.

When using the existing method of molding serpentine tubes, a large volume of flash must be removed from the articles for recycling. The use of the present method and apparatus is believed to be substantially less time consuming and expensive than the existing method.

We claim:

1. A method of blow-molding a hollow, elongated, serpentine plastic article comprising the steps of:
   (a) closing a pair of blow mold halves to define a serpentine blow mold cavity having open upper and lower ends which are closeable by respective upper and lower pinch-off gates, said blow mold cavity comprising regions of distinct bends;
   (b) introducing a parison which is smaller than the mold cavity into one of the open ends of the mold cavity;
   (c) blowing air into the mold cavity while guiding the parison through the mold cavity, the blowing air issuing from said regions of distinct bends being sufficient to maintain the parison centered in the mold cavity while driving the parison toward said other open end while substantially preventing sticking of the parison to sides of the mold cavity;
   (d) closing said open ends of said mold cavity by means of said upper and lower pinch-off gates; and,
   (e) applying air under pressure to the interior of the parison to blow mold the hollow serpentine, plastic article.

2. A method according to claim 1, wherein a vacuum is drawn on the other end of the mold cavity while air is blown against the exterior of the parison to assist in introduction of the parison into the mold; and both of said open ends of the mold cavity are closed following loading thereof with the parison.

* * * * *